United States Patent
Liu

(10) Patent No.: US 11,147,262 B2
(45) Date of Patent: Oct. 19, 2021

(54) ELECTRIC MOUSETRAP WITH INTELLIGENT DETECTION AND SAFETY PROTECTION FUNCTIONS

(71) Applicant: Yu-Chen Liu, Guangdong (CN)

(72) Inventor: Yu-Chen Liu, Guangdong (CN)

(73) Assignee: HANDLE TECH (SZ) CO., LTD., Guangdong (CN)

( * ) Notice: Subject to any disclaimer, the term of this patent is extended or adjusted under 35 U.S.C. 154(b) by 70 days.

(21) Appl. No.: 15/866,548

(22) Filed: Jan. 10, 2018

(65) Prior Publication Data

US 2018/0139949 A1    May 24, 2018

(30) Foreign Application Priority Data

Oct. 24, 2017    (CN) .......................... 201711001351.4

(51) Int. Cl.
| | | |
|---|---|---|
| *A01M 23/38* | (2006.01) | |
| *A01M 99/00* | (2006.01) | |
| *A01M 23/16* | (2006.01) | |

(52) U.S. Cl.
CPC ............ *A01M 23/38* (2013.01); *A01M 23/16* (2013.01); *A01M 99/00* (2013.01)

(58) Field of Classification Search
CPC ....... A01M 23/38; A01M 23/16; A01M 99/00
USPC ...................................................... 43/98, 99
See application file for complete search history.

(56) References Cited

U.S. PATENT DOCUMENTS

| | | | | |
|---|---|---|---|---|
| 2,595,130 | A * | 4/1952 | Edwards ............... | A01M 23/38 43/77 |
| 5,369,907 | A * | 12/1994 | Lee ........................ | A01M 23/38 43/69 |
| 6,836,999 | B2 * | 1/2005 | Rich ...................... | A01M 19/00 43/98 |
| 7,219,466 | B2 * | 5/2007 | Rich ...................... | A01M 23/38 43/98 |
| 7,509,770 | B2 * | 3/2009 | Gardner, Jr. .......... | A01M 1/026 43/107 |
| 7,530,195 | B2 * | 5/2009 | Muller .................. | A01M 23/12 43/58 |
| 7,690,147 | B2 * | 4/2010 | Wetzel .................. | A01M 23/38 43/98 |

(Continued)

*Primary Examiner* — Darren W Ark
*Assistant Examiner* — Kevin M Dennis
(74) *Attorney, Agent, or Firm* — Raymond Y. Chan; David and Raymond Patent Firm

(57) ABSTRACT

The invention relates to an electric mousetrap with intelligent detection and safety protection functions, which includes a cavity structure defined by an upper shell and a base and provided with a hole, wherein a power supply module, an intelligent control circuit board, an indication module and a high-voltage generator module are mounted on the upper shell; three mutually-independent electrode plates are arranged on the base and all electrically connected with the intelligent control circuit board, and the intelligent control circuit board receives signals transmitted from the electrode plates and controls the indication module and the high-voltage generator module to act correspondingly after processing the signals. The electric mousetrap can intelligently detect the activity condition of a mouse in the mousetrap and electrically shock the mouse, is safe in use and has a good power saving effect.

10 Claims, 5 Drawing Sheets

(56) References Cited

U.S. PATENT DOCUMENTS

| | | | | |
|---|---|---|---|---|
| 7,757,430 B2* | 7/2010 | Wetzel | A01M 23/38 | 43/98 |
| 8,024,888 B2* | 9/2011 | Wetzel | A01M 31/002 | 43/98 |
| 8,099,900 B2* | 1/2012 | Rivera | A01M 31/002 | 43/98 |
| 8,151,514 B2* | 4/2012 | Bucher | A01M 23/38 | 43/99 |
| 8,418,398 B2* | 4/2013 | Bucher | A01M 23/14 | 43/99 |
| 8,599,026 B2* | 12/2013 | Lloyd | A01M 23/16 | 340/573.2 |
| 8,621,777 B2* | 1/2014 | Rivera | A01M 23/38 | 43/98 |
| 9,253,971 B2* | 2/2016 | Rivera | A01M 23/38 | |
| 2005/0044775 A1* | 3/2005 | Rich | A01M 31/002 | 43/98 |
| 2005/0144830 A1* | 7/2005 | Rich | A01M 31/002 | 43/98 |
| 2006/0123693 A1* | 6/2006 | Muller | A01M 23/38 | 43/99 |
| 2009/0013587 A1* | 1/2009 | Wetzel | A01M 19/00 | 43/98 |
| 2009/0192763 A1* | 7/2009 | Gardner, Jr. | A01M 31/002 | 702/187 |
| 2009/0313880 A1* | 12/2009 | Bucher | A01M 23/14 | 43/99 |
| 2011/0109460 A1* | 5/2011 | Lloyd | A01M 31/002 | 340/573.2 |
| 2014/0055270 A1* | 2/2014 | Perry | A01M 23/16 | 340/573.2 |
| 2014/0373430 A1* | 12/2014 | Knudsen | A01M 23/38 | 43/98 |
| 2017/0354139 A1* | 12/2017 | Vickery | A01M 23/30 | |
| 2018/0249699 A1* | 9/2018 | Daly, Jr. | A01M 31/002 | |
| 2019/0029246 A1* | 1/2019 | Kletzli | A01M 23/38 | |
| 2020/0033285 A1* | 1/2020 | Nakane | G01N 27/223 | |

* cited by examiner

ELECTRIC MOUSETRAP WITH INTELLIGENT DETECTION AND SAFETY PROTECTION FUNCTIONS

BACKGROUND OF THE INVENTION

Technical Field

The invention relates to the technical field of trapping instruments, in particular, to an electric mousetrap.

Description of Related Art

With the development and improvement of science and technology, mouse trapping equipment is gradually updated. As novel mouse trapping instruments, electric mousetraps have already replaced traditional mouse trapping devices to be applied more and more widely. An electric mousetrap on the present market adopts two metal electrode plates for detection so as to sense a mouse entering the electric mousetrap, namely the electric mousetrap can be triggered to generate high voltage once the mouse touches the two electrode plates of the mousetrap. The existing electric mousetrap has the following defects that firstly, the safety of users cannot be ensured, the electric mousetrap instantly generates high voltage and discharges through the metal electrode plates once the users trigger the two electrode plates, and consequentially the users can be electrically shocked; secondly, the electrode plates do not have the foreign matter sensing function, when foreign matter exists or the humidity of the electrode plates is too high, high-voltage discharge is directly discharged after the electric mousetrap is powered on, and the accidents of electric shocks to the users are caused; thirdly, when a mouse enters the electric mousetrap and touches the metal electrode plates in the mousetrap, the mousetrap can be triggered to generate high-voltage electric shocks, and as the mouse has not completely entered the mousetrap yet at the moment, the mouse can run away and fails to be trapped through electric shocks.

BRIEF SUMMARY OF THE INVENTION

To overcome the defects of limited service safety and limited mouse trapping efficiency of mousetraps in the prior art, the invention provides an electric mousetrap with intelligent detection and safety protection function.

According to the technical scheme adopted by the invention for solving the technical problems, an electric mousetrap with intelligent detection and safety protection functions comprises a cavity structure defined by an upper shell and a base and provided with a hole, and is characterized in that a power supply module, an intelligent control circuit board, an indication module and a high-voltage generator module are mounted on the upper shell, three mutually-independent electrode plates, namely the front electrode plate, the middle electrode plate and the rear electrode plate, are sequentially arranged on the base and all electrically connected with the intelligent control circuit board, and the intelligent control circuit board receives signals transmitted from the electrode plates and controls the indication module and the high-voltage generator module to act correspondingly after processing the signals.

According to the electric mousetrap with intelligent detection and safety protection functions of the invention, the electrode plates are in contact connection with the intelligent control circuit board through electrode slices, foreign matter between the electrode plates or the humidity of the electrode plates of the electric mousetrap can be detected according to the fact whether the front electrode plate and the middle electrode plate or the middle electrode plate and the rear electrode plate are triggered or not, and the indication module provides corresponding indications.

According to the electric mousetrap with intelligent detection and safety protection functions of the invention, through the design that high voltage can be generated only when it is detected that the signal between the front electrode plate and the middle electrode plate and the signal between the middle electrode plate and the rear electrode plate are triggered at the same time in a certain time, the safety of the electric mousetrap in use is ensured.

According to the electric mousetrap with intelligent detection and safety protection functions of the invention, when the detection result of the signal between the front electrode plate and the middle electrode plate and the signal between the middle electrode plate and the rear electrode plate shows that the other pair of electrode plates are also triggered in a certain time after any pair of electrode plates are triggered, the electric mousetrap generates high voltage, and thus a mouse entering the spaces between the electrode plates is intelligently detected and electrically shocked.

According to the electric mousetrap with intelligent detection and safety protection functions of the invention, after the high voltage is generated for a set electric shock time, the signal between the front electrode plate and the middle electrode plate and the signal between the middle electrode plate and the rear electrode plate are detected again, the high-voltage module is started again if the circuit is triggered, and thus movement of the mouse between the electrode plates is intelligently detected.

According to the electric mousetrap with intelligent detection and safety protection functions of the invention, when the detection result of the signal between the front electrode plate and the middle electrode plate and the signal between the middle electrode plate and the rear electrode plate shows that under the triggered condition, any pair of electrode plates are not triggered again after the set time is up, the automatic detection and reset function is achieved.

According to the electric mousetrap with intelligent detection and safety protection functions of the invention, the intelligent control circuit board comprises an arousing detection circuit, the arousing detection circuit is in a power-saving sleep mode at ordinary times and is triggered to operate through by detecting the signal between the front electrode plate and the middle electrode plate and the signal between the middle electrode plate and the rear electrode plate, and the signals are detected again after the set time is up so that the operating mode in the subsequent stage can be determined, and the standby power-saving and intelligent arousing functions are achieved accordingly.

The electric mousetrap with intelligent detection and safety protection functions of the invention has the following beneficial effects that the intelligent control circuit board, the indication module and the high-voltage generation module are additionally mounted based on an original electric mousetrap, the three mutually-independent electrode plates are arranged on the base of the mousetrap and all electrically connected with the intelligent control circuit board, high voltage starts to be generated when a mouse sequentially touches the three electrode plates in a set time, and the intelligent control circuit board receives signals transmitted from the electrode plates and controls the indication module and the high-voltage generator module to act correspondingly after processing the signals, so that the mouse is intelligently detected and electrically shocked, and the success rate of mouse trapping is greatly increased; meanwhile, through the detection method and the detection mechanism of the three electrode plates, the risk that users or pets are electrically shocked when mistakenly triggering the electric mousetrap can be effectively avoided; through automatic detection and electric leakage detection conducted after the electric mousetrap is powered on, the safety in use is greatly improved; through the intelligent regular detection function, it is ensured that the electric mousetrap returns to the standby state when not triggered correctly, and thus the power-saving effect is achieved.

BRIEF DESCRIPTION OF THE SEVERAL VIEWS OF THE DRAWINGS

A further description of the invention is given with the accompanying drawings and an embodiment as follows, in the drawings.

DETAILED DESCRIPTION OF THE INVENTION

Figure 1:
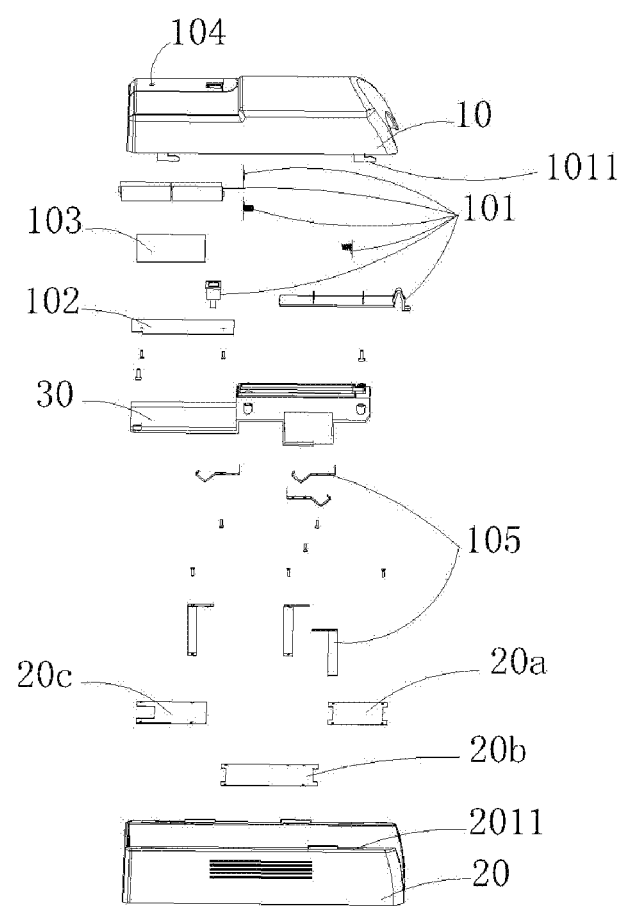
FIG. 1 is a breakdown structural diagram of an electric mousetrap with intelligent detection and safety protection functions of the invention.

For a better understanding of the purposes, technical schemes and advantages of the invention, a further detailed description of the invention is given with the accompanying drawings and the embodiment. It should be understood that the specific embodiment in the following description is only used for explaining the invention and not for limiting the invention.

As is shown in FIGS. 1-5, an electric mousetrap with intelligent detection and safety protection functions of the invention comprises a cavity structure defined by an upper shell 10 and a base 20 and provided with a hole in one side, and by adoption of the structure, an electrocuted mouse can be directly dumped conveniently through the hole, touch removal of the mouse by hand and direct vision contact with the mouse are avoided; a power supply module 101, an intelligent control circuit board 102, an indication module and a high-voltage generator module 103 are mounted on the upper shell 10, and the power supply module 101 supplies power to the whole device through a battery and an external DC power supply; power supply from the battery is cut off automatically when the external power supply is used for supplying power, and thus the service life of the battery is prolonged; when the external DC power supply fails, the battery can be automatically switched to supply power, and thus normal use of the device is ensured; the high-voltage generator module 103 is used for generating high voltage, and after a voltage boosting instruction from a central control unit is received, a high-voltage generator is started to generate high voltage, and electrode plates discharge to shock a mouse electrically; the indication module is used for indicating the operating states in different operating modes and showing the operating states through different flashing ways of an indicator lamp 104. When the voltage of the battery is lower than a set value, the indicator lamp 104 can indicate the low voltage, the user is informed that the battery needs to be replaced in time, and thus the electric shock effect is not affected; when the voltage of the battery is greater than the set value, the user can be informed of the excessively high voltage so as to adjust the input voltage, and thus the situation that the high-voltage generator module 103 is damaged by the excessively high input voltage, and consequentially the electric shock effect is affected is avoided; in addition, after a signal detection module is triggered by a mouse and the mouse is shocked electrically, the indicator lamp 104 can give out an alarm indication so as to remind the user to clean the electric mousetrap of the invention in time.

Figure 2:
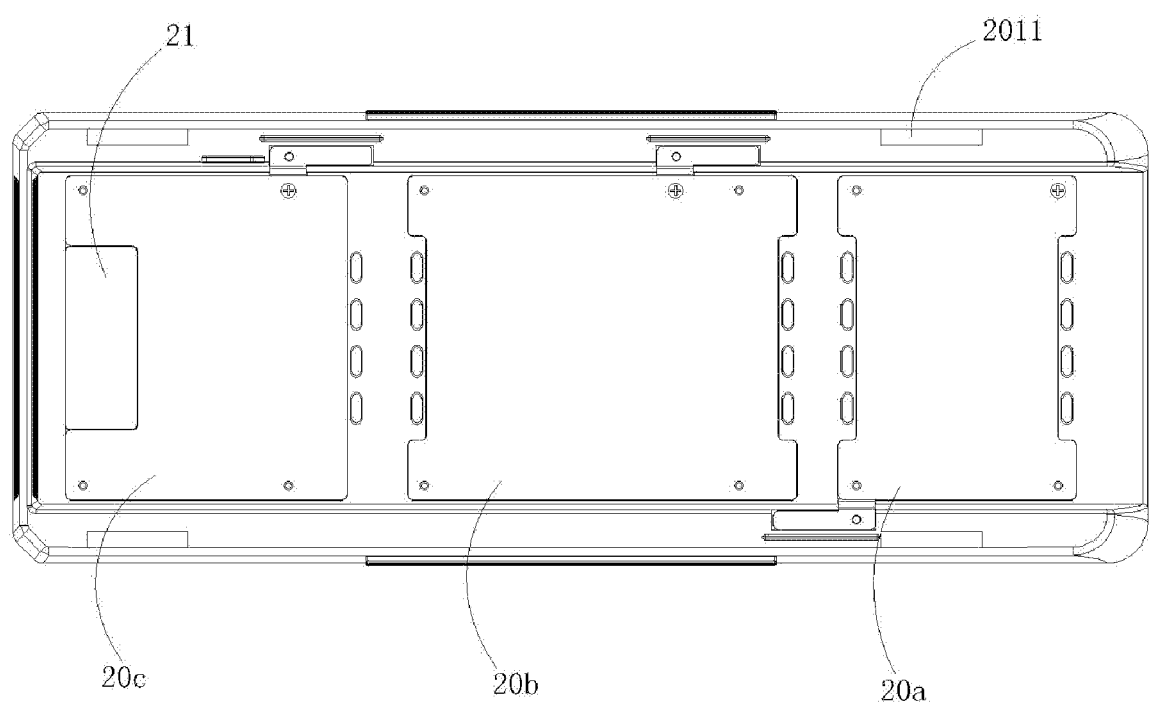
FIG. 2 is a planar structural diagram of a base of the electric mousetrap with intelligent detection and safety protection functions of the invention.

As is shown in FIG. 2, a front electrode plate 10a, a middle electrode plate 10b and a rear electrode plate 10c which are sequentially distributed inwards along the hole and are mutually independent are arranged on a base plate 201 of the base 20 and are all electrically connected with the intelligent control circuit board 102, and a storage box 21 is located in the innermost portion of the base 20 and used for storing bait for attracting mice. The intelligent control circuit board 102 receives outside signals transmitted from the electrode plates and controls the high-voltage generator module 103 and the indicator 104 to act correspondingly after processing the signals, for example, high-voltage electric shocks are generated or prompt alarms are given. Specifically, when a mouse touches the front electrode plate 10a firstly after entering the mousetrap, the circuit is not triggered at the moment; when the mouse continues to walk inwards and touches the middle electrode plate 10b, the circuit is aroused, however, the high-voltage generator module 103 does not operate at the moment; when the mouse further touches the rear electrode plate 10c, the intelligent control circuit board 102 is completely triggered, and the high-voltage generator starts to operate. In this way, the high-voltage generator module 103 cannot be triggered when the mouse touches the front electrode plate 10a only or touches the front electrode plate 10a and the middle electrode plate 10b only, and similarly, the user cannot be shocked electrically when accidentally touching the front electrode plate 10a or the middle electrode plate 10b; in addition, the mousetrap is designed mainly for mice, the user can hardly trigger the three electrode plates at the same time in use, and thus the safety of the mousetrap in use is extremely high. The electric mousetrap on the present market adopts two electrode plates for detection and consequentially is quite likely to be triggered to cause high-voltage electric shock accidents; compared with the electric mousetrap on the present market, the electric mousetrap of the invention well solves the safety problem.

On the other hand, after the rear electrode plate 10c is triggered by a mouse, an intelligent detection circuit instantly starts a high-voltage generation circuit at the moment, and high-voltage electric shocks are generated on the front electrode plate 10a, the middle electrode plate 10b and the rear electrode plate 10c at the same time. By adoption of the detection method, the situation that the existing electric mousetrap provided with two electrode plates starts electric shocks once being triggered by a mouse, and consequentially the mouse escapes is well prevented; the electric mousetrap of the invention can intelligently detect the mouse entering the spaces between the electrode plates, so that effective electric shocks after the mouse enters the electric mousetrap are effectively ensured, and the success rate of mouse trapping is greatly increased.

According to the electric mousetrap of the invention, after the high-voltage generator module 103 is triggered, high-voltage electric shocks are generated on the front electrode plate 10a, the middle electrode plate 10b and the rear electrode plate 10c at the same time. The electric shock time is set for the intelligent control circuit board 102, and thus the intelligent control circuit board 102 can return to the detection state again after the set electric shock time is up; if it is detected that the mouse triggers the front electrode plate 10a and the middle electrode plate 10b or the middle electrode plate 10b and the rear electrode plate 10c again in a set detection time, it indicates that the mouse is still moving in the electric mousetrap and electric shocks did not succeed, at the moment, the intelligent control circuit board 102 starts high-voltage electric shocks again, and the detection process is repeated after the set electric shock time is up. Through the intelligent detection function for movement between the electrode plates, it can be ensured that the mouse is electrocuted successfully. Through the detection method of the invention, the problem of the existing electric mousetrap provided with two electrode plates that a mouse revives and then escapes when not completely electrocuted or dies after crawling out of the electric mousetrap, consequentially, the user cannot clear away the dead mouse in time, and the environment is polluted is well solved. The electric mousetrap of the invention well prevents the situation that a mouse revives and then escapes when not successfully electrocuted and ensures that the mouse is successfully electrocuted in the electric mousetrap.

Figure 3:
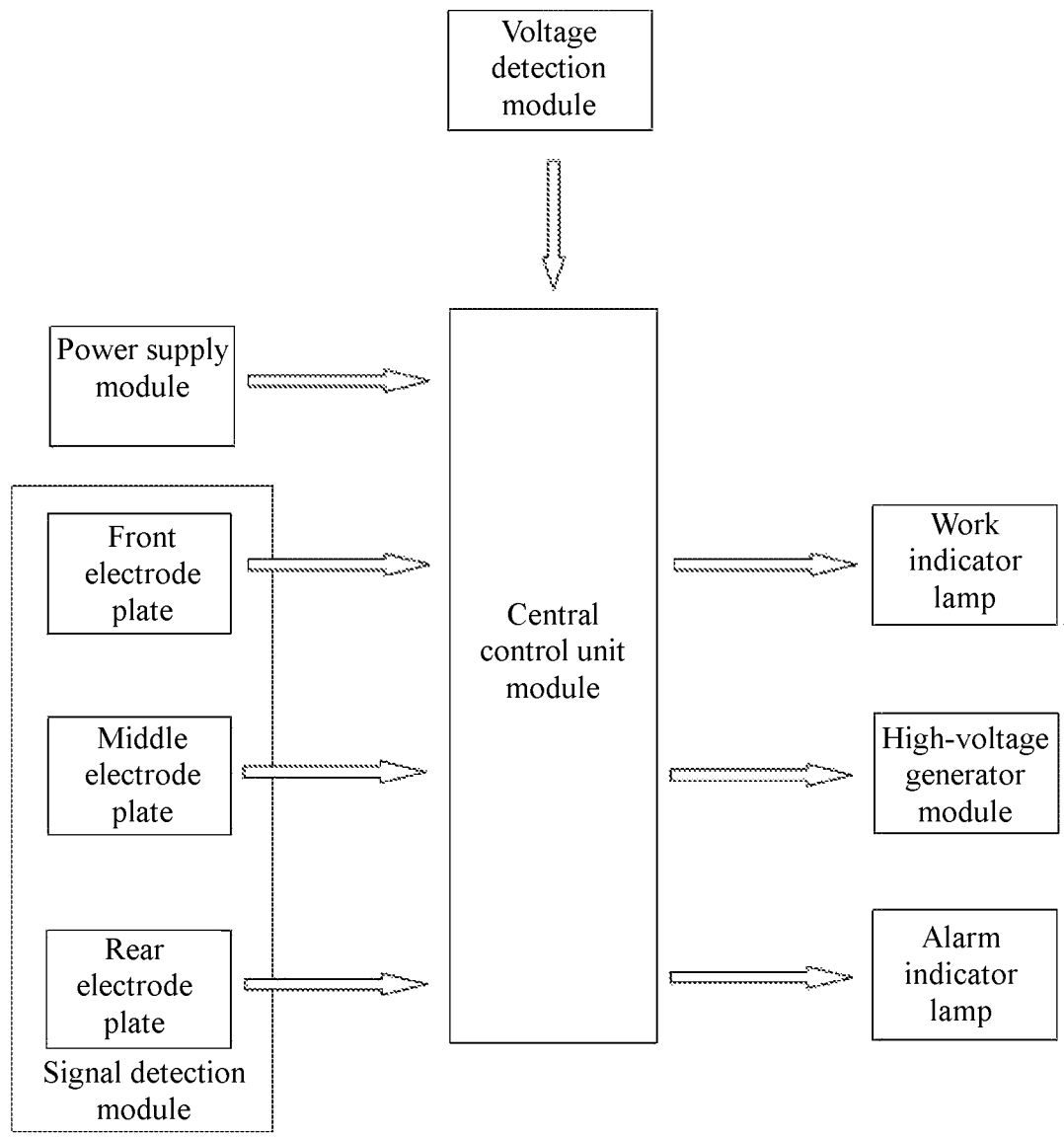
FIG. 3 is a block diagram of the circuit principle of the electric mousetrap with intelligent detection and safety protection functions of the invention.
Figure 4:
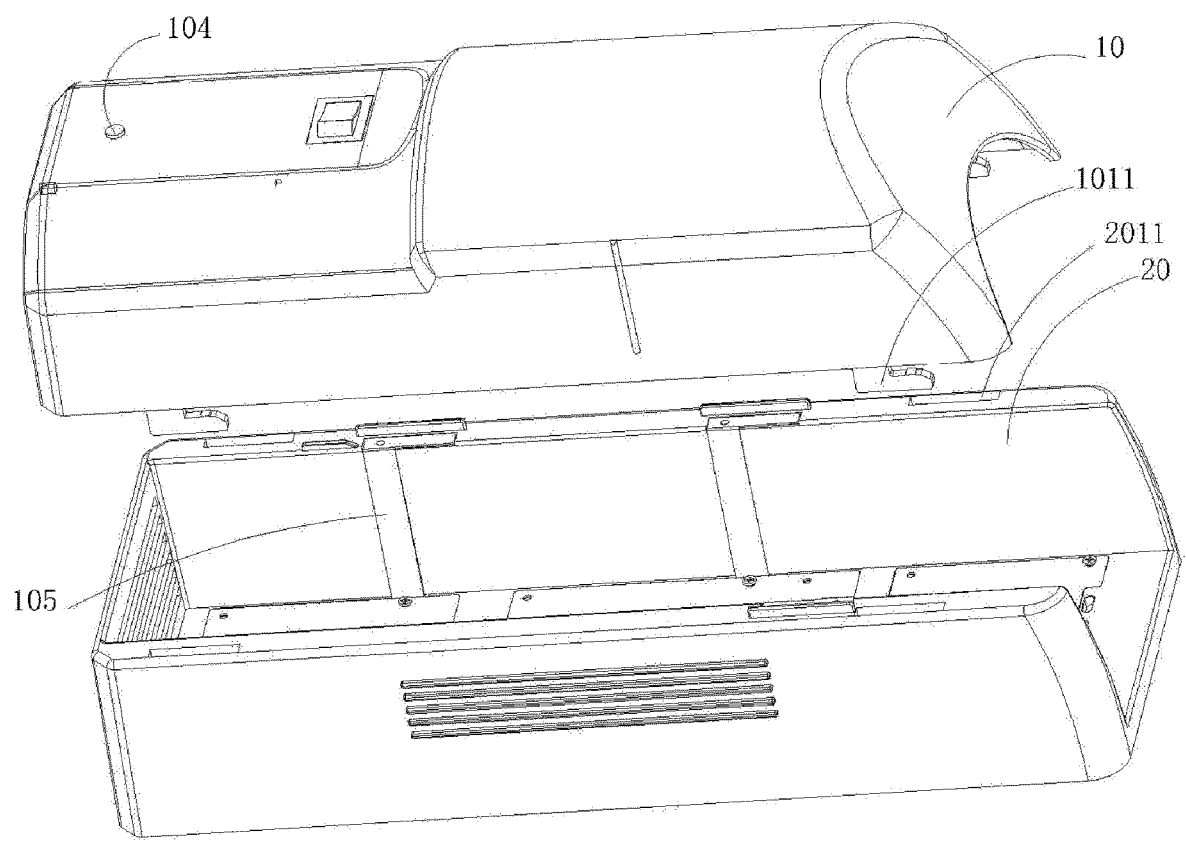
FIG. 4 is an appearance diagram of the electric mousetrap with intelligent detection and safety protection functions of the invention when the electric mousetrap is in a disassembled state.
Figure 5:
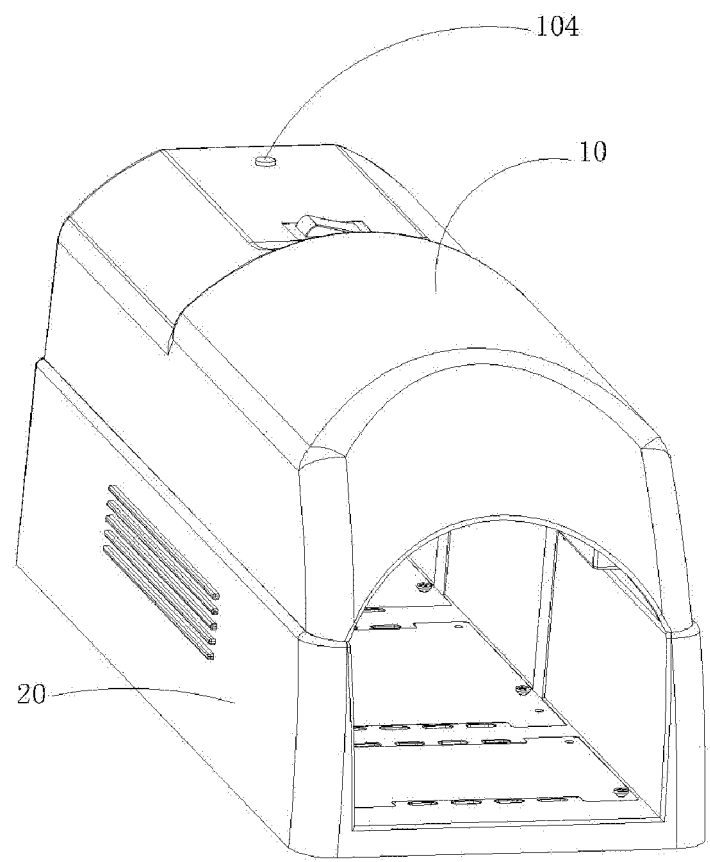
FIG. 5 is an appearance diagram of the electric mousetrap with intelligent detection and safety protection functions of the invention when the electric mousetrap is in use.

The electric mousetrap of the invention adopts the three electrode plates for detection, as is shown in FIG. 3, the intelligent control circuit board 102 comprises a signal detection module, a central control unit, a voltage detection module and an indication module, wherein the signal detection module and the voltage detection module transmit detection signals to the central control unit, and the central control unit sends a processed instruction to a high-voltage transmitter module and the indication module for execution; specifically, the signal detection module is used for detecting input of an outside trigger signal, comprises an arousing detection circuit and a trigger detection circuit, and is connected with the front electrode plate 10a, the middle electrode plate 10b and the rear electrode plate 10c through three input points separately. After a mouse enters the electric mousetrap from the front end, the mouse firstly touches the front electrode plate 10a, and the circuit is not triggered at the moment; when the mouse continues to walk inwards and touches the middle electrode plate 10b, the trigger detection circuit operates at the moment, the electric mousetrap in the dormant state is aroused, however, the high-voltage generation circuit is not triggered; after the electric mousetrap is aroused, if the mouse continues to walk inwards and touches the rear electrode plate 10c in a set time, the high-voltage generation circuit can be started instantly, and high-voltage electric shocks are generated on the front electrode plate 10a, the middle electrode plate 10b and the rear electrode plate 10c at the same time. Detection is conducted again after the set electric shock time is up, if it is detected that the mouse does not trigger the front electrode plate 10a and the middle electrode plate 10b or the middle electrode plate 10b and the rear electrode plate 10c again, it indicates that the mouse is electrocuted successfully, and the central control unit controls the electric mousetrap to automatically rest and to return to the standby state. Through the automatic detection and reset function, the trouble of manual reset is avoided, and the mouse trapping function in the subsequent stage is not affected.

For the electric mousetrap in the standby state, after a mouse enters the electric mousetrap from the front, the mouse touches the front electrode plate 10a firstly, the circuit is not triggered to operate at the moment; when the mouse continues to walk inwards and touches the middle electrode plate 10b, the front electrode plate 10a and the middle electrode plate 10b are triggered at the same time, and then the electric mousetrap is aroused; after the electric mousetrap is aroused, whether the front electrode plate 10a, the middle electrode plate 10b and the rear electrode plate 10c are continuously triggered or not is detected in a set time, if yes, the electric mousetrap is kept in the aroused operating state, and if not, the electric mousetrap returns to the standby mode after the set time is up, so that the purposes of standby power saving and intelligent arousing are achieved, and the service life of the battery is greatly prolonged. Based on the specific structure and electronic circuit design of the electric mousetrap of the invention, the three electrode plates are used for detection, so that power consumption of the circuit in the standby state is extremely low, and the normal electric shock effect is not affected; meanwhile, power consumption of the whole electric mousetrap in the standby state is extremely low, and thus the service cycle of the electric mousetrap is prolonged to a great extent.

In addition, the electric mousetrap of the invention also has an automatic power-on detection function, and after the electric mousetrap is powered on, the intelligent control circuit board 102 judges whether foreign matter exists on the electrode plates or not or judges whether the humidity of the electrode plates is too high or not by detecting signal input between the front electrode plate 10a and the middle electrode plate 10b and as well as between the middle electrode plate 10b and the rear electrode plate 10c. When the intelligent control circuit 102 detects that foreign matter exists on the electrode plates or the humidity of the electrode plates is too high, the user is reminded through the indicator lamp 104 to clear away the foreign matter in time or to use the electric mousetrap normally after the electric mousetrap is dry. As the electric mousetrap on the present market does not have the function of sensing foreign matter on electrode plates, the risk of electric leakage can be caused when foreign matter exists or the humidity of the electrode plates is too high, and users can be electrically shocked since high-voltage discharge can be directly triggered after the electric mousetrap is powered on; the electric mousetrap of the invention effectively solves the problems of the existing electric mousetrap, the user can be informed of handling corresponding failure problems in time, and the safety in use is further ensured.

Furthermore, the electrode plates are in contact connection with the intelligent control circuit board 102 through electrode slices 105. Through contact connection, the connection form between the electrode plates and the intelligent control circuit board 102 on the upper shell 10 is simplified while stable connection is ensured, and the hole structure formed by the cavity of the novel electric mousetrap of the invention is more similar to a true mouse hole.

Furthermore, the upper shell 10 and the base 20 are connected through buckles, the upper shell 10 and the base 20 can be manually separated after the buckles are arranged, and thus foreign matter and electrocuted mice on the electrode plates and various residual odors can be cleared away conveniently. Specifically, L-shaped hooks 1011 are arranged on the side edges of the upper shell 10, grooves 2011 are formed in corresponding positions of the base 20, the L-shaped hooks 1011 slide in the grooves 2011 so that the upper shell 10 and the base 20 can be fixed together and separated, and operation is quite convenient.

Furthermore, the upper shell 10 is in an arc shape, a middle shell 30 is fixed in the upper shell 10, and the power supply module, the intelligent control circuit board and the high-voltage generator module are mounted on the middle shell 30. Through the arc-shaped shell, on the one hand, the appearance of the electric mousetrap of the invention is more similar to a mouse hole in shape, and on the other hand, the middle shell 30 is additionally arranged so that the components on the upper shell 10 can be mounted conveniently.

According to the electric mousetrap with intelligent detection and safety protection functions in the above embodiment of the invention, the power supply module, the intelligent control circuit board, the indication module and the high-voltage generator module are mounted on the upper shell, the three mutually-independent electrode plates are arranged on the base and all electrically connected with the intelligent control circuit board, the intelligent control circuit board receives signals transmitted from the electrode plates and controls the indication module and the high-voltage generator module to act correspondingly after processing signal, and thus the electric mousetrap with intelligent detection and safety protection functions has the following effects that firstly, the function of sensing foreign matter on the electrode plates and the function of sensing the too high humidity of the electrode plates after the electric mousetrap is powered on are achieved, and the electric leakage detection function and the alarming function are also achieved, so that the operation safety is ensured when the electric mousetrap is powered on; secondly, the high-voltage generator can be triggered to generate high voltage through the electrode plates only when the three electrode plates are touched at the same time, and the user can hardly trigger the three electrode plates at the same time in use, so that the safety of the electric mousetrap in use is extremely high; thirdly, a mouse entering the spaces between the electrode plates is intelligently detected after the front electrode plate and the middle electrode plates are aroused, electric shocks are started after the rear electrode plate is also triggered within a set time, and thus intelligent detection and electric shocking are achieved. fourthly, after the mouse enters the electrode plates, the activity condition of the mouse in the electrode plates can be intelligently detected, and the mouse can be electrically shocked, so that the success rate of mouse trapping is greatly increased; fifthly, through intelligent analysis on the contact condition of the electrode plates and the mouse in a set time, the automatic detection and reset function and the intelligent arousing function are achieved, the electric mousetrap can automatically return to the standby state, and accordingly the service cycle of the electric mousetrap and the service life of the battery are prolonged greatly; sixthly, through intelligent voltage detection by the voltage detection module, the battery and the external DC can be intelligently switched to supply power, and meanwhile, the voltage condition can be detected for alarming, so that the service life of the battery is prolonged, and the intelligence of the electric mousetrap is improved.

Although the invention is disclosed through the above embodiment, the protection scope of the invention is not limited to the above embodiment, and transformations, substitutes and the like of the above components made without deviating from the concept of the invention are all within the claim scope of the invention.

What is claimed is:

1. An electric mousetrap, comprising:
   an upper shell;
   a base secured to said upper shell to form a cavity;
   a power supply module located in said cavity;
   a high-voltage generator module connected to said power supply module;
   front, middle and rear electrode plates connected to said high-voltage generator module, wherein said front, middle and rear electrode plates sequentially distributed inwards along said cavity and are independently operated; and
   a control circuit board electrically connected to said front, middle and rear electrode plates and configured to activate among a dormant state, a standby state, an aroused operating state, a first shocking state, and a repeat shocking state, wherein said dormant state, said standby state, said aroused operating state, said first shocking state, and said repeat shocking state are activated by said control circuit board in sequence, wherein said control circuit board is further configured to detect a humidity of each of said front, middle and rear electrode plates for safety purpose;
   wherein at said dormant state, all of said front, middle and rear electrode plates are untouched while said power supply module provides minimum power consumption;
   wherein at said standby state, said first electrode plate is initially touched, said high-voltage generator is not triggered, and said power supply module provides minimum power consumption;
   wherein at said aroused operating state, said front and middle electrode plates are triggered when said middle electrode plate is touched after said front electrode plate is touched, while said high-voltage generator is not triggered;
   wherein at said first shocking state, said front, middle and rear electrode plates are triggered when said rear electrode plate is touched after said middle electrode plate is touched, said high-voltage generator is triggered to generate a high voltage at said front, middle and rear electrode plates at a same time for a predetermined electric shock time;
   wherein at said repeat shocking state for ensuring successful electrocution, said high-voltage generator is repeatedly triggered again to generate the high voltage at said front, middle and rear electrode plates at a same time after said predetermined electric shock time of said first shocking state when said front and middle plates are sequentially touched or when said middle and rear electrode plates are sequentially touched, such that said front, middle and rear electrode plates are formed in pair for detection at said repeat shocking state.

2. The electric mousetrap, as recited in claim 1, further comprising a middle shell fixed in said upper shell, wherein said power supply module, said high-voltage generator module and said control circuit board are disposed on said middle shell.

3. The electric mousetrap, as recited in claim 1, wherein said repeat shocking state is kept repeating until said front, middle and rear electrode plates are not triggered.

4. The electric mousetrap, as recited in claim 2, wherein said repeat shocking state is kept repeating until said front, middle and rear electrode plates are not triggered.

5. The electric mousetrap, as recited in claim 1, further comprising a storage box disposed at said cavity at a position rearward of said rear electrode plate.

6. The electric mousetrap, as recited in claim 4, further comprising a storage box disposed at said cavity at a position rearward of said rear electrode plate.

7. The electric mousetrap, as recited in claim 1, wherein said upper shell is detachably fastened to said base.

8. The electric mousetrap, as recited in claim 6, wherein said upper shell is detachably fastened to said base.

9. The electric mousetrap, as recited in claim 1, further comprising a plurality of electrode slices electrically connecting said front, middle and rear electrode plates to said control circuit board.

10. The electric mousetrap, as recited in claim 8, further comprising a plurality of electrode slices electrically connecting said front, middle and rear electrode plates to said control circuit board.

\* \* \* \* \*